US008024424B2

(12) United States Patent
Freimuth et al.

(10) Patent No.: US 8,024,424 B2
(45) Date of Patent: *Sep. 20, 2011

(54) IN-KERNAL CONTENT-AWARE SERVICE DIFFERENTIATION

(75) Inventors: Douglas M. Freimuth, New York, NY (US); Ashish Mehra, Clovis, CA (US); Renu Tewari, San Jose, CA (US); Thiemo Voigt, Uppsala (SE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/544,026

(22) Filed: Aug. 19, 2009

(65) Prior Publication Data
US 2009/0307350 A1  Dec. 10, 2009

Related U.S. Application Data

(60) Division of application No. 11/933,200, filed on Oct. 31, 2007, now abandoned, which is a continuation of application No. 10/053,012, filed on Jan. 18, 2002, now Pat. No. 7,315,892.

(60) Provisional application No. 60/301,292, filed on Jun. 27, 2001.

(51) Int. Cl.
*G06F 15/16* (2006.01)
(52) U.S. Cl. ........................................ 709/217
(58) Field of Classification Search ............... 709/206, 709/217
See application file for complete search history.

(56) References Cited

U.S. PATENT DOCUMENTS

| 5,898,830 | A | | 4/1999 | Wesinger et al. |
| 5,968,176 | A | | 10/1999 | Nessett et al. |
| 5,983,270 | A | * | 11/1999 | Abraham et al. ............ 709/224 |
| 6,009,475 | A | | 12/1999 | Shrader |
| 6,137,777 | A | | 10/2000 | Vaid et al. |
| 6,182,226 | B1 | | 1/2001 | Reid et al. |
| 6,341,309 | B1 | | 1/2002 | Vaid et al. |
| 6,457,008 | B1 | | 9/2002 | Rhee et al. |
| 6,529,950 | B1 | | 3/2003 | Lumelsky et al. |

(Continued)

OTHER PUBLICATIONS

RFC 793:Transmission Control Protocol DARPA Internet Program Protocol Specification Sep. 1981, prepared by Information Sciences Institute.

*Primary Examiner* — Benjamin R Bruckart
(74) *Attorney, Agent, or Firm* — Law Offices of Ira D. Blecker, P.C.

(57) ABSTRACT

The increasing number of Internet users and innovative new services such as e-commerce are placing new demands on Web servers. It is becoming essential for Web servers to provide performance isolation, have fast recovery times, and provide continuous service during overload at least to preferred customers. The invention describes a kernel-based architecture for content-aware service differentiation that protects Web servers against overload by controlling the amount and rate of work entering the system. We have invented a mechanism that provides admission control and service differentiation based on connection and application level information. The application header-based connection control uses application-level information (such as URIs and cookies for HTTP) to define different service differentiation actions. The present invention provides the kernel mechanisms that are more efficient and scalable than application level controls implemented in current Web servers.

14 Claims, 9 Drawing Sheets

U.S. PATENT DOCUMENTS

| | | |
|---|---|---|
| 6,546,423 B1 | 4/2003 | Dutta et al. |
| 6,574,666 B1 | 6/2003 | Dutta et al. |
| 6,598,034 B1 | 7/2003 | Kloth |
| 6,658,571 B1 | 12/2003 | O'Brien et al. |
| 6,725,456 B1 | 4/2004 | Bruno et al. |
| 6,728,885 B1 | 4/2004 | Taylor et al. |
| 6,738,909 B1 | 5/2004 | Cheng et al. |
| 6,779,181 B1 | 8/2004 | Yu et al. |
| 6,785,728 B1 | 8/2004 | Schneider et al. |
| 6,807,667 B1 | 10/2004 | Bar et al. |
| 6,976,258 B1 | 12/2005 | Goyal et al. |
| 6,985,937 B1 | 1/2006 | Keshav et al. |
| 7,089,294 B1 | 8/2006 | Baskey et al. |
| 7,168,078 B2 | 1/2007 | Bar et al. |
| 2001/0053149 A1 | 12/2001 | Mo et al. |
| 2001/0056492 A1 | 12/2001 | Bressoud et al. |
| 2002/0046284 A1 | 4/2002 | Brabson et al. |
| 2002/0099854 A1 | 7/2002 | Jorgensen |
| 2002/0116527 A1* | 8/2002 | Chen et al. .................... 709/245 |
| 2002/0129064 A1 | 9/2002 | Guthrie |
| 2004/0215811 A1 | 10/2004 | Bar et al. |
| 2006/0112155 A1 | 5/2006 | Earl et al. |

* cited by examiner

| Classification Rule | ActionRule |
| --- | --- |
| 701 URI: */cgi-bin/* | DROP |
| 702 URI: */?/* | Rate control = 20,2 |
| 703 Cookie: usrtype=GOLD | Schedule order, Priority=1 |
| 704 URI: */shoppingcart/* | Rate control = 10, 1<br>Schedule order, Priority=2 |
| 705 Client IP: a.b.c.*<br>URI: */search/* | DROP |

IN-KERNAL CONTENT-AWARE SERVICE DIFFERENTIATION

PRIORITY

This application is a divisional of U.S. patent application Ser. No. 11/933,200, filed Oct. 31, 2007 now abandoned, which is a continuation of U.S. patent application Ser. No. 10/053,012, filed Jan. 18, 2002, now U.S. Pat. No. 7,315,892, which is a nonprovisional of, and claims priority from, Provisional Application 60/301,292, filed, Jun. 27, 2001.

FIELD OF THE INVENTION

This invention is directed to the field of operating systems and computer networking. It is more particularly directed to enable content-aware service differentiation in servers which communicate with clients over a network.

BACKGROUND OF THE INVENTION

Application service providers and Web hosting services that co-host multiple customer sites on the same server cluster or large SMP's are becoming increasingly common in the current Internet infrastructure. The increasing growth of e-commerce on the web means that any server down time that affects the clients being serviced will result in a corresponding loss of revenue. Additionally, the unpredictability of flash crowds can overwhelm a hosting server and bring down multiple customer sites simultaneously, affecting the performance of a large number of clients. It becomes essential, therefore, for hosting services to provide performance isolation, fast recovery times, and continuous operation under overload conditions at least to preferred customers.

Each of the co-hosted customers sites may have different quality-of-service (QoS) goals based on the price of the service and the application requirements. Furthermore, each customer site may require different services during overload based on the client's identity (preferred gold client) and the content they access (e.g., a client with a buy order versus a browsing request). When providing service differentiation during overload it is important to know who the request was from and what it is intended to do. The current techniques of using the incoming connections network header values to differentiate requests is not sufficient. The network headers (IP address and port numbers) only identify the origin client machine and the destination client machine and the receiving application at the destination port. With clients behind a proxy all clients will share the same network and cannot be distinguished. Similarly the type of request that can be determined from the port number as being an FTP transfer vs. an HTTP transfer but cannot distinguish a browse order from a buy order. Current commercial switches and routers use a simple threshold-based request discard policy (e.g., a TCP SYN drop mode) to discard the incoming, oldest or any random connection to control overload. Such techniques may delay or control overload but pay a penalty by discarding a high priority gold customer request instead of an ordinary request. These content-unaware approaches are not adequate as they do not distinguish between the individual QoS requirements. For example, a majority of the load is caused by a few CGI requests and most of the bytes transferred belong to a small set of large files. It has been shown in earlier studies that 90% of the web requests are for 10% of the pages at a site. But 10% of the requests account for 80% of the data transferred.

Consider for example, a news site with a small size main page which is accessed by a majority of the customers. Few customers will download a large audio/video news segment which will cause a high load on the server and the network. If all the small page requests were dropped they would possibly not reduce the server load as much as the single video segment request. This suggests that targeting specific information and client identities (e.g., URIs, types of URIs, cookie information, SSL session ids) for service differentiation can have a wide impact during overload.

One approach to do content-aware service differentiation is to do it within the application or in user space. Clearly when content-based control is performed it requires that the application is modified and is aware of service differentiation functions during overload. This does not achieve application transparency. Modifying legacy applications is difficult. Secondly, control is handed to the application at a much later stage compared to when the operating system kernel processing begins. In such a case low priority requests or requests that will be discarded subsequently will use precious server resources during overload for no useful work. The service differentiation during overload should follow the "early discard" policy. In this case prioritizing a request or deciding to discard or delay a request should be done as soon as the request is received by the kernel. This implies that an ideal location of content-aware service differentiation is within the operating system kernel.

SUMMARY OF THE INVENTION

To overcome these problems, the present invention embodies new kernel mechanisms that enable Web servers to provide content-aware service differentiation functions such as policing actions, request dropping, request prioritization, request rate control, and request scheduling, during overload based on client identity and application-specific information. The industry focus on QoS has been network centric but our invention resides on the server allowing for tighter integration with applications and application data like URI's and cookies. Outbound QoS traffic controls alone are not enough to provide the necessary service differentiation required in the current Web server environment. The level of service differentiation required can be provided with integrated outbound and inbound traffic control kernel mechanisms which classify requests based on application content.

In this invention we describe methods, systems and apparatus for content-aware service differentiation for overloaded servers within the server operating system. One service-differentiation police action includes silently dropping a communication request received based on the request content. An alternate action is to send a specific message to the client informing that the service is unavailable. In an alternate action the communication request received is scheduled in the kernel based on the request content to determine the order in which the requests are accepted. Different scheduling policies can be specified for this action. In one scheduling policy a priority ordering can be used where a higher priority request is serviced first by the application. A second policy is to use a weighted round-robin ordering where the weights are determined by the service differentiation requirement. In an alternate action the communication request is rate controlled based on the request content. The rate control action limits the rate of new requests entering the system and the number of concurrent requests that are allowed to enter the system. In an alternate action the statistics of the incoming requests are monitored and recorded based on the request content.

Thus, the present invention introduces kernel mechanisms in the networking stack of the operating system to support content-aware service differentiation and admission control based on client attributes (IP address, SSL session id, port etc.), server attributes (IP address, type), and the request content (e.g., URI accessed, CGI request information, cookie attributes etc.).

An advantage of a kernel-based approach is that it provides lower overhead and better performance for service differentiation as it is placed in the request processing path of the kernel (in the networking stack). It enables "informed early discard" where control can be enforced in the early stages of a request lifetime without consuming system resources but with full knowledge of the request type and client identity. Secondly, it can be implemented easily in any commercial operating system without any complex change to the underlying architectures. Finally, it can be deployed in both the server as well as any external switch or router that controls a cluster of server machines.

BRIEF DESCRIPTION OF THE DRAWINGS

These and other aspects, features, and advantages of the present invention will become apparent upon further consideration of the following detailed description of the present invention when read in conjunction with the drawing figures, in which.

DESCRIPTION OF THE INVENTION

The present invention provides methods, systems and apparatus to efficiently perform content-aware service differentiation in the kernel for overloaded servers based on application layer information. In a first example embodiment of the present invention we leverage the fact that the majority of traffic received by servers from external clients uses the HTTP protocol which in turn is sent over a TCP transport connection. The HTTP header information can be used to identify the type of request, the client identity and other client specific information that can be used to perform informed service differentiation. With the increasing deployment of e-commerce sites, sessions or Web transactions are widely used where web servers exploit cookies in the HTTP header to identify session state. These cookies include attribute value pairs that can also be used to uniquely identify a client and the nature and type of the request. In this embodiment the information in the HTTP headers (URI name or type, cookie attribute-value pairs or other header tags) are used to provide content-aware service differentiation. An alternate embodiment provides application header-based service differentiation, that enables content-aware service differentiation by examining information in any application header sent over a transport protocol.

The service differentiation mechanisms are placed in the kernel's networking stack to transparently intercept the data packets of a new TCP connection to parse the layer headers, classify the attributes in the header based on the classifier rules and find a matching rule and then apply the associated service differentiation action rules that include but are not limited to:

(i) controlling the rate and burst of new incoming requests,
(ii) dropping (or terminating) a new request,
(iii) scheduling request accept order (i.e., ordering requests based on priority or a weighted round-robin order in the accept queue),
(iv) monitoring and recording request statistics.

The classifier involves parsing the (HTTP in this example) header in the kernel and applying an action rule includes waking the sleeping server process only after a decision on how to service the connection is made based on the action rule.

Figure 1:
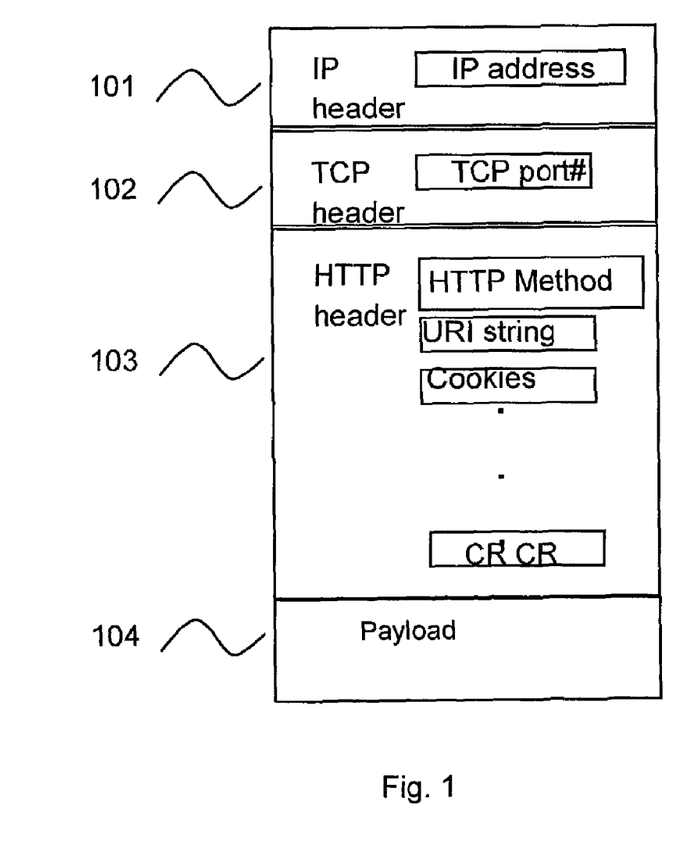
FIG. 1 is a diagram that shows the header format of a standard IP packet, a TCP packet and an HTTP message.

FIG. 1 shows the formats of a standard HTTP message that includes a IP (101) and TCP (102) packet headers and the HTTP (103) header with the HTTP payload (104). The IP header (101) includes in particular the source and destination IP addresses. The TCP packet header (102) includes the port numbers. The HTTP header (103) includes in particular the HTTP command, the URI being accessed and the list of cookies. The HTTP header is terminated by two CR control characters. The kernel detects the HTTP header semantics by parsing the data stream to detect the delimiter for the header.

Figure 2:
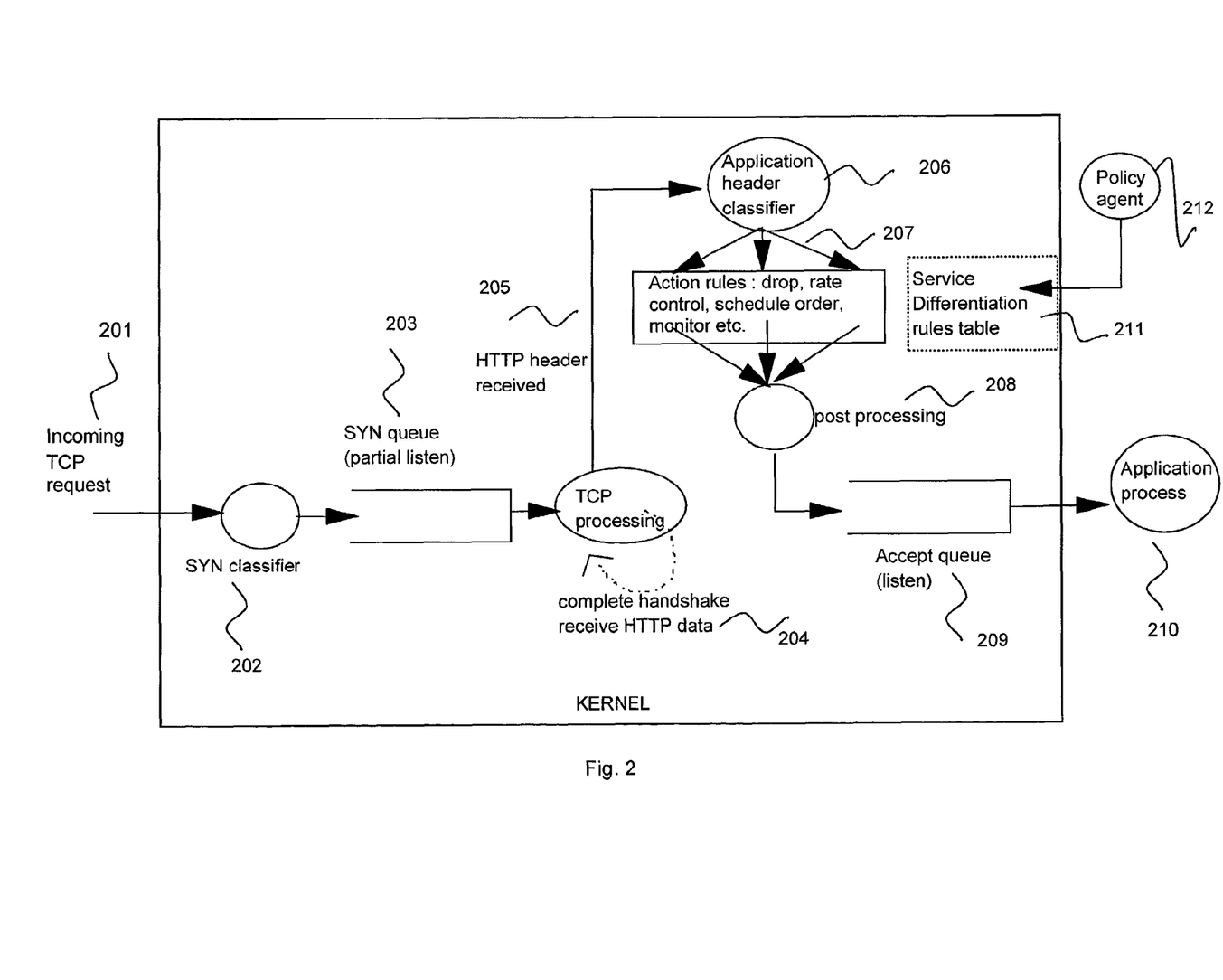
FIG. 2 is an example diagram that shows the components of the system architecture of the networking stack for HTTP header based service differentiation, which includes a classifier, an incoming connection queue (also called SYN queue or partial listen queue), an HTTP header classifier, the service differentiation rule table having classification rules and action rules and their processing engine, and a queue of accepted connections (also called accept queue or listen queue), along with the incoming TCP connections and the receiving processes and an external policy agent, in accordance with the present invention.

FIG. 2 shows the architecture for application header-based service differentiation. The incoming TCP connection (201) is classified using a SYN classifier (202) and placed in the SYN queue (203) that includes new connections that are not yet established (i.e., the TCP 3-way handshake is not yet been completed). After the TCP handshake completes and data is received to determine the HTTP header (204), the kernel classifies the request based on the header values (206). Such a classification matches the incoming connection values (e.g., URIs and cookies) to a set of classification rules and their associated action rules. These together are called the service differentiation rules are stored in rule table (211) which are populated by a user level policy agent (212) using any standard mechanism to communicate with the kernel (socket or system calls). Once the request is classified the corresponding action rule is applied to it (207). Based on the type of action, further TCP post processing of the request is performed (208) and the request is placed in a queue of accepted connections (209), also called the accept queue or listen queue. The process (210) sleeping on a listen socket is woken up to service the request at the head of the queue.

Figure 3:
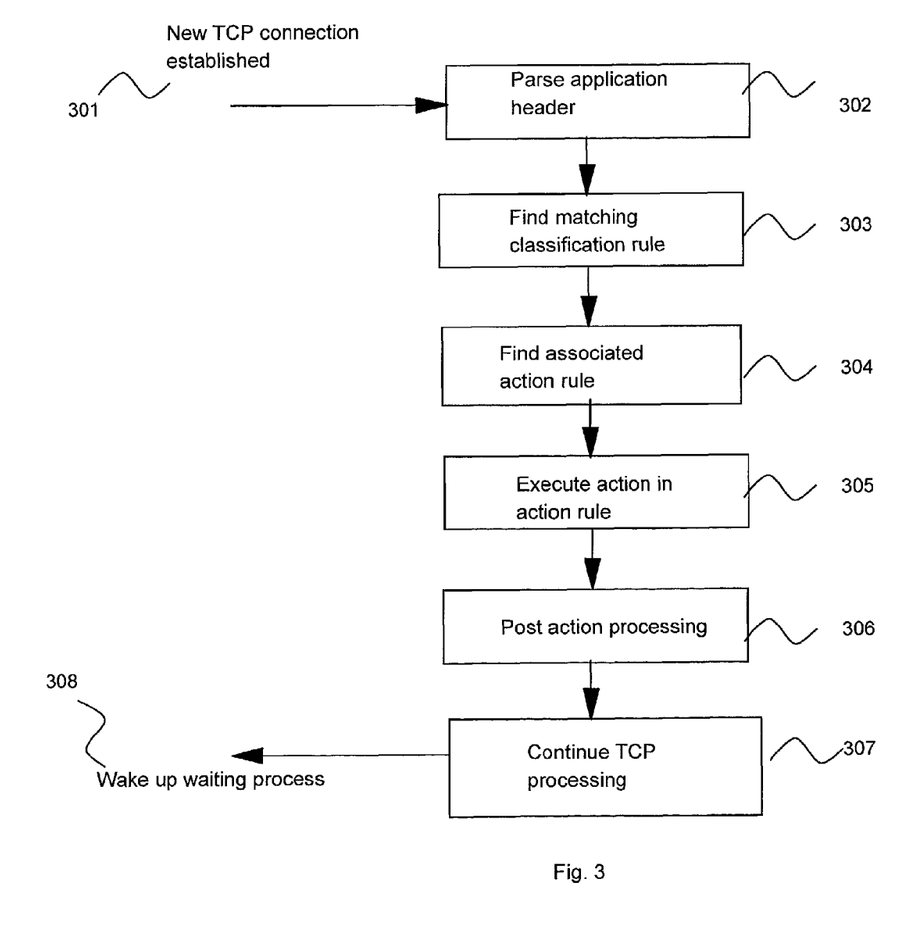
FIG. 3 is an example block diagram that delineates the steps taken by the kernel to execute the associated service differentiation action rule after matching a particular application header-based classification rule in accordance with the present invention.

FIG. 3 is an example block diagram that delineates the steps taken by the kernel for providing a service differentiation action. The data in the new established TCP connection (301) is parsed to detect the application header and its attributes (302). For the HTTP example, this includes determining the URI and cookies. The URI is the 3rd string in the HTTP header and the cookies start with a cookie delimiter as defined in the HTTP protocol in RFC 2068. The parsed header is then matched against the rule table to find a matching classification rule (303). The associated action rule is found (304) which is then executed (305) and the required processing done (306). After that the standard TCP processing continues (307) and the sleeping server process is then woken to continue processing the data (308).

Figure 4:
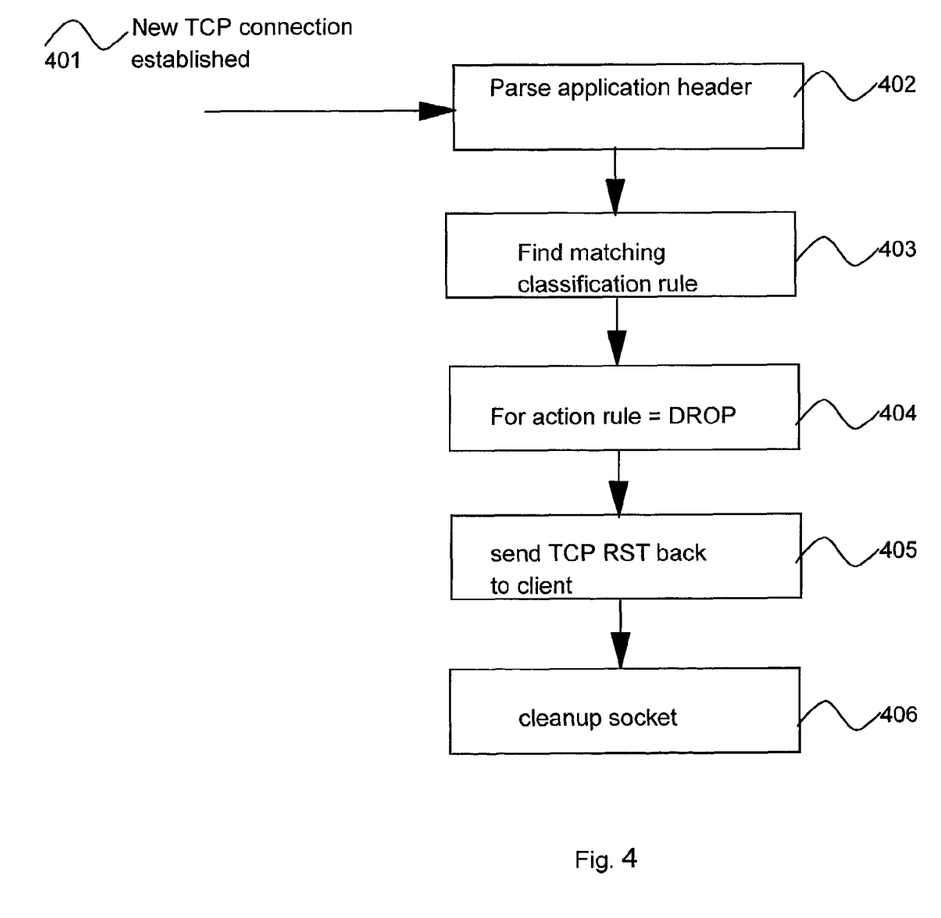
FIG. 4 is an example block diagram that delineates the steps taken by the kernel when the desired action rule is to DROP an incoming connection that matched a particular application header-based rule, in accordance with the present invention.

FIG. 4 is an example block diagram that delineates the steps taken by the kernel when the matching action rule is a connection "drop". The data in the new established TCP connection (401) is parsed to detect the application header (402). For HTTP this includes determining the URI and cookies. The URI is the 3rd string in the HTTP header and the cookies start with a cookie delimiter as defined in the HTTP protocol in RFC 2068. The parsed header is then matched against the rule table to find a matching classification rule (403). When the associated action rule is to discard the connection (by a DROP action in 404) a TCP RST is sent back to the client (405) and a cleanup is performed (406). Alternately, instead of 405, for HTTP, an HTTP packet is sent back with a return code for the server being busy as defined in the HTTP protocol in RFC 2068.

Figure 5:
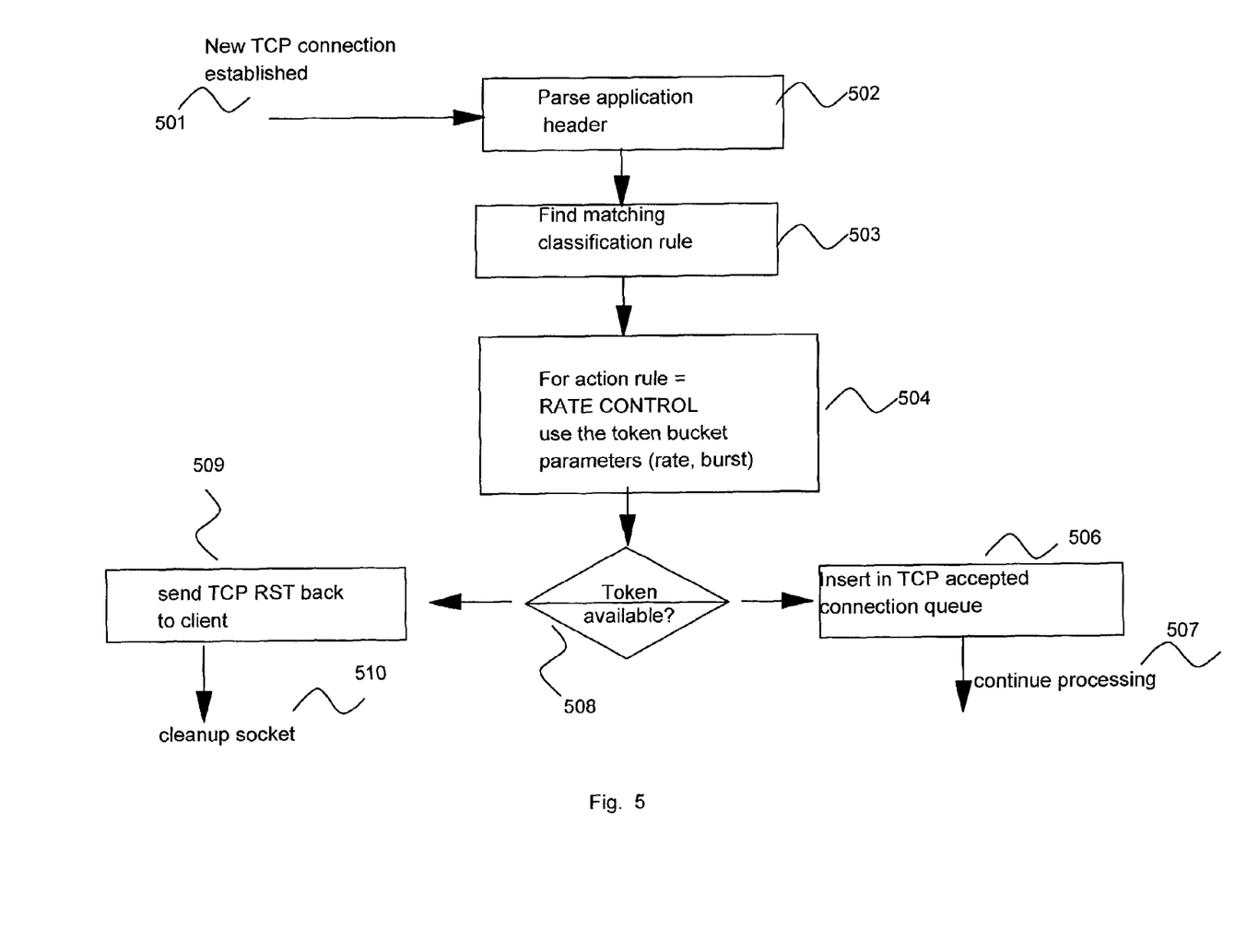
FIG. 5 is an example block diagram that delineates the steps taken by the kernel when the desired action rule is to RATE CONTROL an incoming connection that matched a particular application header-based rule, in accordance with the present invention.

FIG. 5 is an example block diagram that delineates the steps taken by the kernel when the matching action rule is a connection "rate control". The data in the new established TCP connection (501) is parsed to detect the application header (502). The parsed header is then matched against the rule table to find a matching classification rule (503). When the associated action rule is to rate limit the connection (by a RATE CONTROL action in 504) a compliance check is made against a set of token bucket parameters of (rate and burst) (as shown in 504). The rate control parameters include a rate value which is the rate of new connections that are admitted, and a burst value that is the maximum number of concurrent connections that are admitted. A token bucket with depth equal to the burst parameter and a token regeneration rate set to the rate parameter is used to perform the rate control compliance check. If a token is available in the bucket (508), it is consumed and the connection is inserted in the queue of accepted connections (506) in the desired order. After which the standard processing of the TCP connection continues (507). If a token was not available (508), that is the connection is not compliant, the connection is to be discarded and a TCP RST is sent back to the client (509) and the cleanup is performed (510). Alternately instead of 509, for HTTP an HTTP packet is sent back with a return code for the server being busy as defined in the HTTP protocol in RFC 2068.

Figure 6:
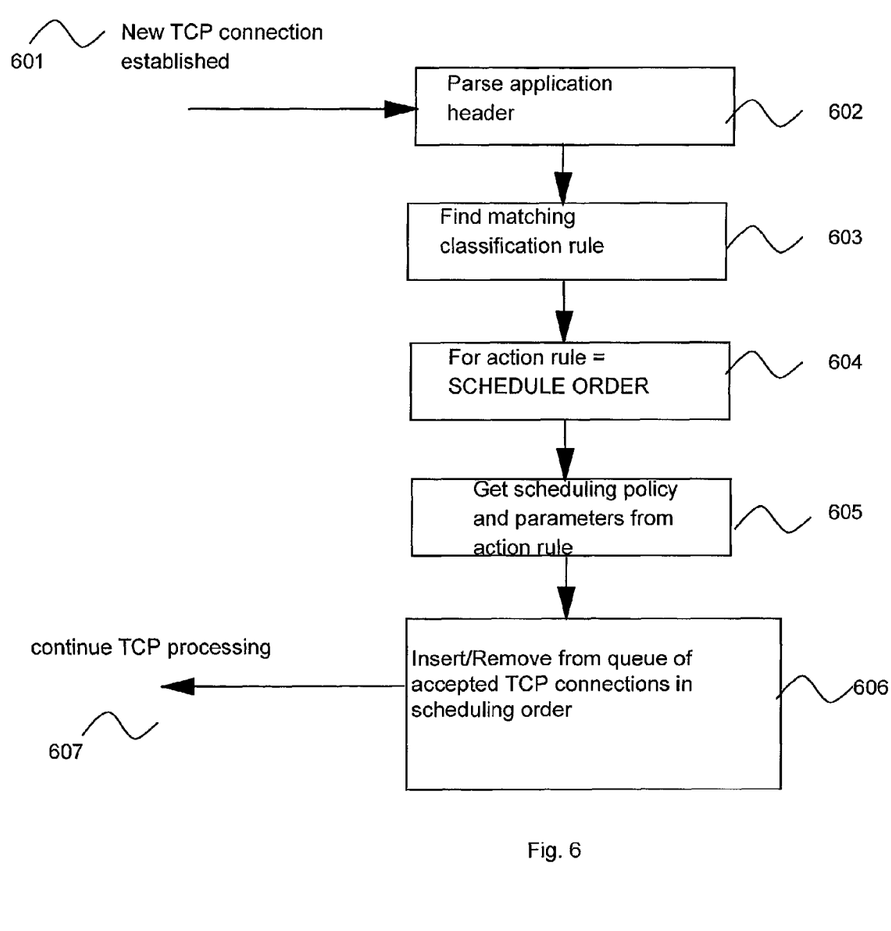
FIG. 6 is an example block diagram that delineates the steps taken by the kernel when the desired action rule is to SCHEDULE ORDER an incoming connection that matched a particular application header-based rule, in accordance with the present invention.

FIG. 6 is an example block diagram that delineates the steps taken by the kernel when the matching action rule is a connection "schedule order". The data in the new established TCP connection (601) is parsed to detect the application header (602). The parsed header is then matched against the rule table to find a matching classification rule (603). When the associated action rule is a schedule ordering (604), the scheduling policy and it's parameters described in the action rule (605) are used to determine the location of the connection in the queue of accepted connections. Any scheduling policy can be used for this purpose. FIG. 6 shows the case when the policy is priority-based scheduling. For priority policy, based on the value of the priority assigned to the connection it is inserted in the list of accepted connections (606) in the highest priority first order, where all connections of higher priority are ahead in the queue and all connections with the same priority are inserted in the FCFS (first come first served) order. After which the standard TCP processing continues (607). By ordering connections by priority, a higher priority request (e.g., a buy order) is serviced first by the web server, instead of a lower priority request (e.g., a browse request), as it is placed earlier in the queue of accepted connections. Another policy example is the weighted round-robin scheduler that defines a weight for each class and determines the number of requests that are selected from each class based on the weight and proceeds in a round-robin fashion. The weights are assigned based on an external administrative policy or dynamically by the kernel.

Figure 7:
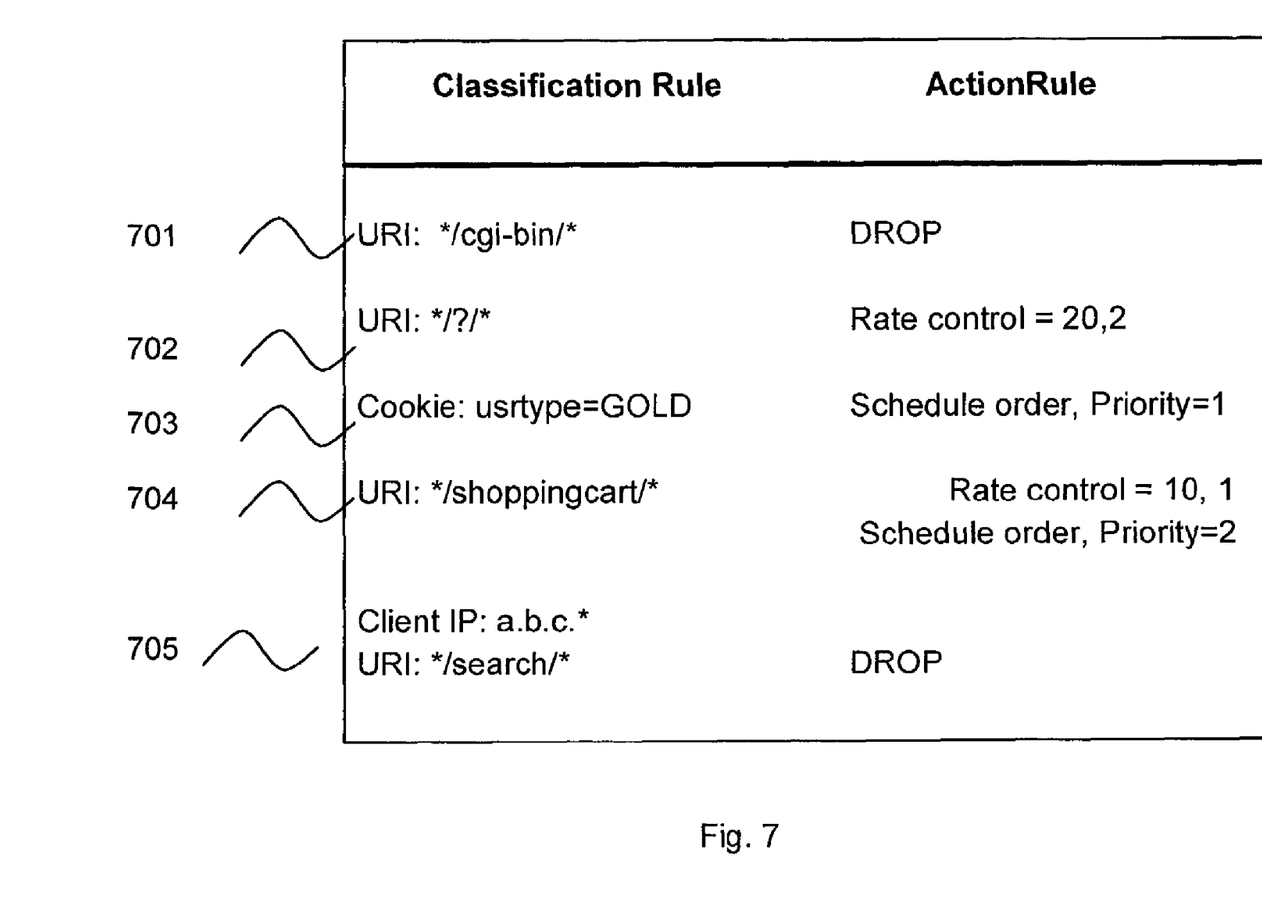
FIG. 7 is an example diagram that shows the format of the rules tables that include a selector field and the corresponding action, in accordance with the present invention.

FIG. 7 shows an example service differentiation rule table which includes a classification rule and action rule pairs. The classification rule could include a URI string (701) with an associated action rule to DROP (701) all connections whose HTTP header included the said URI string. The classification rule could also be a cookie attribute value pair (703) and the action rule including schedule order a priority value (703). In 704, the classification rule includes a URI string with a combined action of rate control along with schedule order with a priority value.

Figure 8:
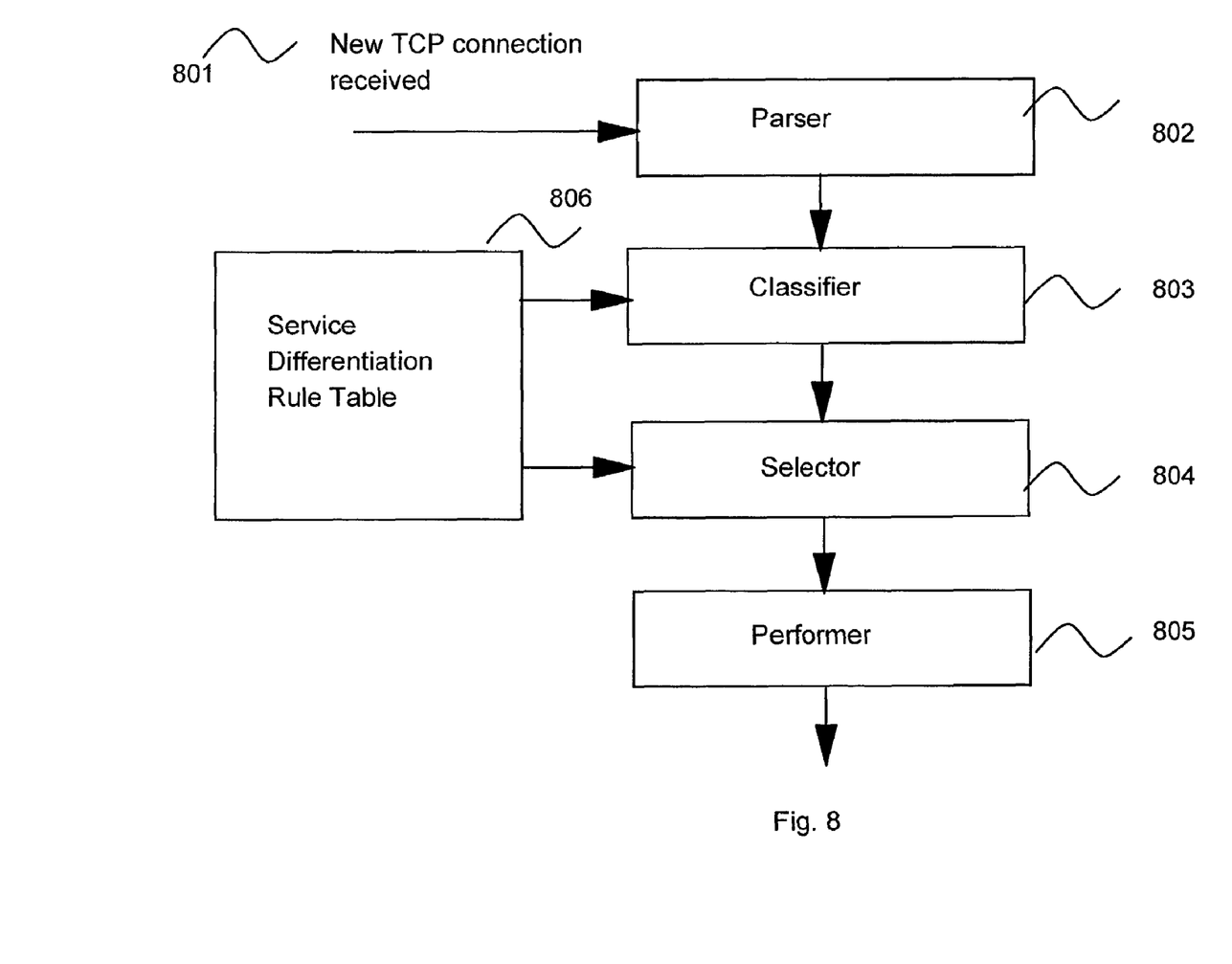
FIG. 8 is an example diagram that delineates the different components of the service differentiation module in the kernel, in accordance with the present invention.

FIG. 8 shows an example of components of the service differentiation module that includes a parser (802) that parses the application headers from the incoming connection (801) and a classifier (803) that classifies the connection based on the classification rules. The selector (804) finds the associated action rule and the performer executes the desired action.

Figure 9:
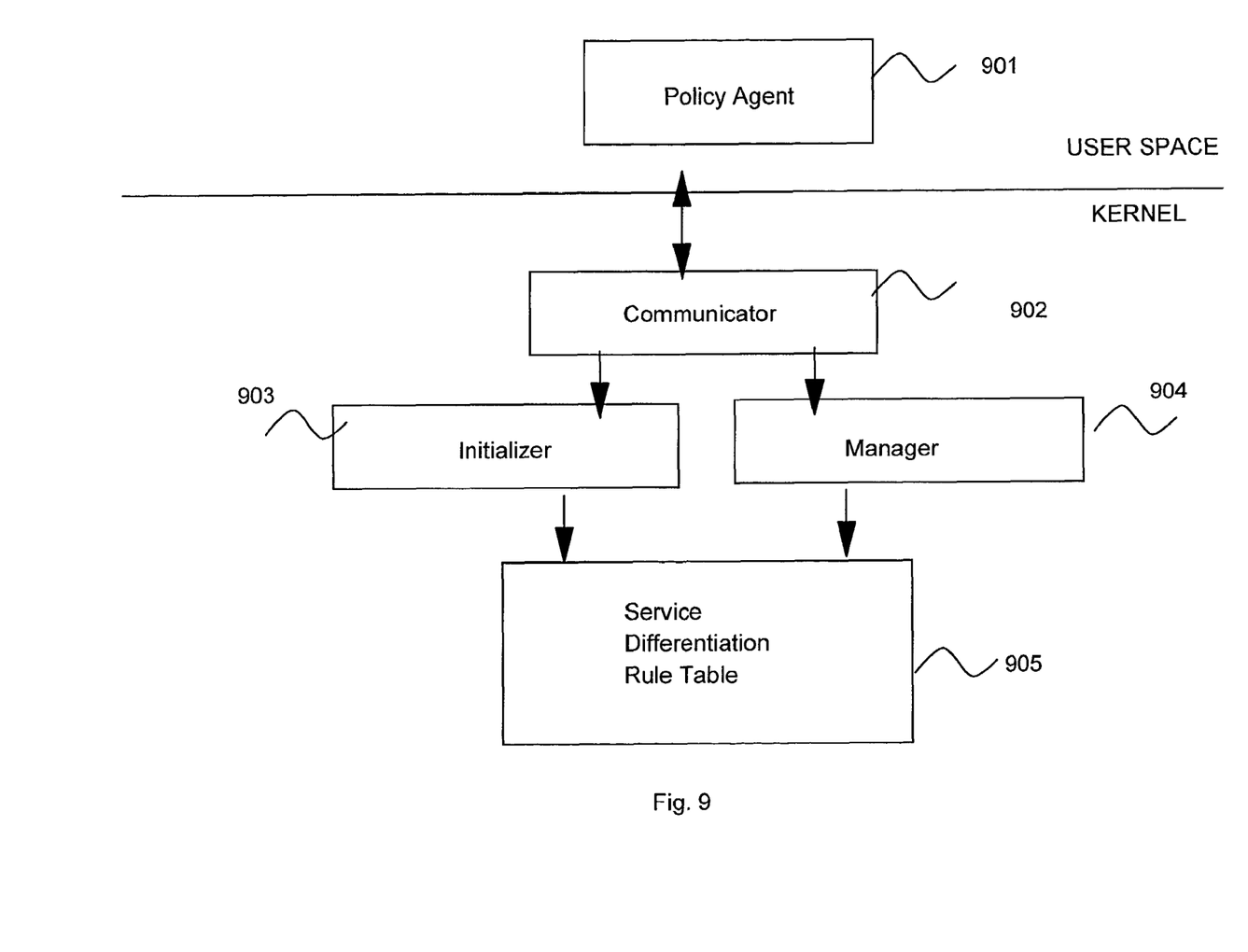
FIG. 9 is an example diagram that delineates the different components of the policy agent and its communication with the kernel, in accordance with the present invention.

FIG. 9 shows the interaction between the user space policy agent (901) and the kernel components. The communicator (902) uses an API to communicate with the policy agent. The initialiser (903) sets up the service differentiation rule table (905) and initializes the rules. The manager (904) adds new rules and deletes and updates existing rules based on the policy agent commands.

Thus the invention also includes a method comprising forming a rule. The step of forming often includes the steps of: communicating from a user space to a kernel with an application interface; instantiating service differentiation rules for an application tag within the kernel which include classification and action rules; and deleting and adding rules based upon a user request. In some embodiments the method further includes updating rules based upon a user request.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the present invention includes an article of manufacture which comprises a non-transitory computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a non-transitory computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the present invention is suitable and applicable to other arrangements and applications. For example, although the description is with regard to HTTP on top of TCP/IP, the concepts of the present invention may similarly be employed for other protocols. It will be clear to those skilled in the art that modifications to the disclosed embodiments can be effected without departing from the spirit and scope of the present invention. The described embodiments ought to be construed to be merely illustrative of some of the more prominent features and applications of the present invention. Other beneficial results can be realized by applying the disclosed invention in a different manner or modifying the present invention in ways known to those familiar with the art.

We claim:

1. A computer system apparatus comprising a non-transitory computing medium enabling functions of a service differentiation module in a kernel of the computer system apparatus and a policy agent in a user space of the computer system apparatus to populate service differentiation rules for the service differentiation module,
   said service differentiation module including:
      a parser to parse a client Web request;
      a classifier to classify the request based on application headers including client identity and application-specific information and assigning a classification rule within the kernel;
      a selector to determine an action rule based on the classification rule;
      a performer to apply the action rule based on the classification rule in order to provide better system performance based on client identity and application-specific information for higher classed packets and connections; and
      a detector to detect establishment of a new connection and establishing of a new TCP connection;
   said policy agent including:
      a communicator to communicate from the user space to the kernel with an application interface;
      an initializer to instantiate service differentiation rules for the service differentiation module within the kernel which include classification and action rules; and
      a manager to delete and update rules on a user request.

2. A computer program product comprising a non-transitory computer usable medium having computer readable program code means embodied therein for causing rule installation, the computer readable program code means in said computer program product for causing a computer to effect the functions of claim 1.

3. A method of populating service differentiation rules for a service differentiation module comprising:
   forming a rule, including the steps of:
      communicating from a policy agent in a user space to a service differentiation module in a kernel with an application interface;
      instantiating service differentiation rules for the service differentiation module within the kernel which include classification and action rules; and
      deleting and adding rules based upon a user request, wherein the service differentiation module is populated with service differentiation rules; and
   further comprising differentiating at least one service class in a kernel to provide different levels of service for system performance to users to perform service differentiation based on content in at least one data packet, said content including client identity and application-specific information, including the steps of
      capturing said at least one data packet until a complete application header is detected;
      parsing said complete application header to determine at least one application tag indicative of application-specific information;
      matching said at least one application tag to at least one matching application-specific service differentiation rule;
      determining a presence of at least one match with said at least one matching rule; and
      performing application-specific service differentiation action based on said at least one matching rule in order to provide a particular level of service from said different levels of service; and
      detecting establishment of a new connection and establishing of a new TCP connection.

4. A method as in claim 3, further comprising updating rules based upon a user request.

5. The method as in claim 3, wherein said at least one application tag includes at least one tag taken from a group of tags including: URI, cookie, request method, HTTP version, a tag in an application protocol, and a tag in a communication protocol.

6. The method as in claim 3, wherein said at least one application tag is a URI, and wherein the URI is the second string in a HTTP header as defined in the application protocol.

7. The method as in claim 3, further comprising employing a table having said at least one matching application-specific service differentiation rule comprising a plurality of classification rules and a corresponding plurality of action rules.

8. The method as in claim 3, wherein the step of determining includes finding a best match.

9. The method as in claim 3, wherein said step of performing service differentiation action includes at least one action taken from a group of actions including: dropping, rate controlling, scheduling connections, monitoring, request prioritization, and a policing action.

10. A method as in claim 9, wherein said action includes at least one act taken from a group of acts including: sending a reset message, sending an application return code, determining compliance with a given rate and/or burst, prioritization, weighted round robin, round robin, ordering, recording statistics, performing a cleanup, and protocol control.

11. The method as in claim 3, wherein said step of performing service differentiation action includes an action of dropping, and wherein said action of dropping includes discarding a connection based on rules that are created to provide better performance to the connections that are accepted.

12. The method as in claim 3, further comprising installing at least one matching application-specific service differentiation rule to provide a higher level of system performance for higher classed packets and connections.

13. The method as in claim 3, wherein said step of establishing of a new TCP connection includes: receiving SYN packet; sending SYN-ACK packet; deferring accept; receiving ACK for SYN-ACK packet; and deferring notification of data packet.

14. The method as in claim 3, wherein said step of capturing includes detecting application header delimiters for said at least one data packet.

* * * * *